United States Patent
Berard et al.

(10) Patent No.: US 9,217,333 B2
(45) Date of Patent: Dec. 22, 2015

(54) COMPOSITE-MATERIAL VANE

(75) Inventors: Sacha Berard, Liège (BE); Hervé Grelin, Villeblevin (FR)

(73) Assignee: Techspace Aero S.A., Milmort (BE)

( * ) Notice: Subject to any disclaimer, the term of this patent is extended or adjusted under 35 U.S.C. 154(b) by 988 days.

(21) Appl. No.: 13/334,537

(22) Filed: Dec. 22, 2011

(65) Prior Publication Data

US 2012/0171044 A1 Jul. 5, 2012

(30) Foreign Application Priority Data

Dec. 30, 2010 (EP) ..................................... 10197416

(51) Int. Cl.
*F01D 5/28* (2006.01)
*F01D 9/02* (2006.01)

(52) U.S. Cl.
CPC ................ *F01D 5/282* (2013.01); *F01D 5/288* (2013.01); *F05C 2225/08* (2013.01); *F05D 2300/603* (2013.01)

(58) Field of Classification Search
CPC ......... F01D 5/282; F01D 5/286; F01D 5/288; F05D 2300/603; F05D 2300/6034; F05C 2225/08; F05C 2253/04
USPC .......... 415/200; 416/229 A, 230, 241 A, 226, 416/219 R, 220 R, 221, 224
See application file for complete search history.

(56) References Cited

U.S. PATENT DOCUMENTS

| | | | |
|---|---|---|---|
| 2,859,936 A | 11/1958 | Warnken | |
| 3,762,835 A | 10/1973 | Carlson et al. | |
| 5,112,194 A * | 5/1992 | More | 416/230 |
| 5,306,120 A * | 4/1994 | Hammer et al. | 416/224 |
| 5,314,309 A * | 5/1994 | Blakeley et al. | 416/226 |
| 5,380,152 A | 1/1995 | Sikorski et al. | |
| 2005/0084375 A1* | 4/2005 | Rodrigues et al. | 416/219 R |
| 2009/0232647 A1* | 9/2009 | Henkle et al. | 415/200 |
| 2010/0080710 A1 | 4/2010 | Schreiber | |
| 2010/0129651 A1 | 5/2010 | Schreiber | |
| 2010/0150707 A1 | 6/2010 | Jevons | |
| 2012/0134839 A1* | 5/2012 | Parkin et al. | 416/230 |

FOREIGN PATENT DOCUMENTS

DE 4237031 2/1994

* cited by examiner

*Primary Examiner* — Christopher Verdier
(74) *Attorney, Agent, or Firm* — Reinhart Boerner Van Deuren P.C.

(57) ABSTRACT

A composite material turbomachine vane comprising a blade is provided, wherein the vane comprises a first resin reinforced with long fibers and a second resin reinforced with short fibers, the first and second resins being chemically compatible or identical, the long fibers serving to stiffen the vane and the short fibers dispersed in the second resin serving to fill in the parts of the vane that are not reinforced by the long fibers and giving the vane its substantially final shape.

15 Claims, 2 Drawing Sheets

COMPOSITE-MATERIAL VANE

CROSS-REFERENCE TO RELATED PATENT APPLICATIONS

This patent application claims the benefit of European Patent Application No. 10197416.0, filed Dec. 30, 2010, the entire teachings and disclosure of which are incorporated herein by reference thereto.

FIELD OF THE INVENTION

The present invention relates to a composite vane used in any field (aeronautics, energy, etc.) where the energy of a flow is exploited. More particularly, the present invention relates to a composite vane used in a turbomachine.

The present invention also relates to a fixed stage or a rotor stage of a turbomachine comprising said composite vanes.

The present invention also relates to a method for manufacturing a composite-material vane.

STATE OF THE ART

Axial compressors are well known per se and are used inter alia in turbomachines.

These low or high pressure compressors comprise several rotary-vane stages, also called mobile vanes, which are separated by rectifier stages, the purpose of which is to reposition the speed vector of the fluid leaving the preceding stage before sending it to the following stage.

Rectifier stages are essentially made up of fixed vanes, also called rectifier vanes, connecting an outer shroud to an inner shroud, both concentric and delimiting the airflow zone or aerodynamics stream.

Today, turbomachine rectifier vanes are made of metal materials such as titanium alloys (TA6V), steel or aluminum.

There are vanes with a simple shape made of composite material such as outlet guide vanes (OGV) located in the secondary stream of a turbojet engine and manufactured using a method for manually depositing pre-impregnated tissues or using the RTM (Resin Transfer Molding) method from braided or woven dry pre-forms.

Also known from U.S. Pat. No. 2,859,936 A is a method for manufacturing a straight vane where the vane comprises at its foot a metal insert used to position resin-impregnated fibers and where a mixture of resin and short fibers is then added into the mold and covers and surrounds the pre-impregnated fibers.

Also known from patent application US 2010/0080710 A1 is a method for manufacturing OGV blades where two metal sheets are welded to form the skin of the vane and a space within which a plastic material is injected. The cohesion between the different components of the vane is solely ensured by the mechanical connection between the skin and the core.

Also known from patent application US 2010/0129651 A1 succeeding the aforementioned application, is a method for manufacturing fan or stator vane blades where a layer of polyurethane is inserted between the metal skin and the composite material of the core in order to ensure better connection between the core and the skin, and thereby reduce the risk of delamination, and also in order to absorb the expansion differences between the composite material of the core and the metal skin.

Also known from application US 2010/0150707 A1 is a method for manufacturing composite-material vane blades, such as OGVs, where the blade comprises a hollow enclosure formed from distinct layers of composite material and also comprises a core with a corrugated shape and positioned in the enclosure and ensuring the spacing of the enclosure walls. Platforms are fastened to the ends of the blade by welding or gluing.

The methods for manufacturing composite vanes of the state of the art each have one or several of the following drawbacks:
  they do not allow to produce complex shapes;
  they allow to produce vanes with a relatively significant thickness (15-20 mm) such as OGV vanes, and do not allow to produce compressor vanes with smaller thicknesses (less than 10 mm);
  the platform(s) of the vane are not integrated with the blade of the vane and must therefore be attached later;
  the cohesion between the component parts of the vane is ensured by a mechanical connection.

AIMS OF THE INVENTION

The present invention aims to provide a solution that allows to overcome the drawbacks of the state of the art.

The present invention thus aims to produce vanes with complex shapes, while limiting subsequent machining or finishing operations.

The present invention also aims to produce vanes with a wide range of possible thicknesses.

The present invention also aims to produce vanes with a blade and a platform in a single piece.

The present invention also aims to produce vanes where the cohesion between the different component parts is ensured using a chemical bond.

MAIN CHARACTERISTIC ELEMENTS OF THE INVENTION

The present invention relates to a composite-material turbomachine vane comprising a blade, wherein said vane comprises a first resin reinforced by long fibers and a second resin reinforced by short fibers, said first and second resins being chemically compatible or identical, said long fibers serving to stiffen the vane and said short fibers dispersed in the second resin serving to fill in the parts of the vane that are not reinforced by the long fibers and giving the vane its substantially final shape.

According to specific embodiments of the invention, the vane comprises one or a suitable combination of the following features:
  it comprises, at one end of the blade, a means for fastening said vane to an external element and said fastening means is integrated into the blade of the vane;
  the long fibers are positioned at the skin end of the vane or in an intermediate position between the skin end and the core of the vane;
  the long fibers are positioned so that a same long fiber can be positioned both at the skin end of the vane and at the same time in an intermediate position between the skin end and the core end of the vane;
  the long fibers are continuous between the blade and the fastening means;
  the fastening means is a platform or bulb in the shape of a dovetail;
  the blade and the platform form an L-shape or a T-shape;
  the short fibers and the long fibers are selected from the group consisting of glass fibers of and carbon fibers;
  the long fibers are unidirectional or woven and the short fibers have a length that is shorter than a few millimeters;

the first and second resins are thermoplastic resins;
the first and second resins are thermosetting resins;
the skin of the vane is also comprises erosion-protected;
the first resin and/or the second resin comprise(s) fillers ensuring protection of the vane against erosion.

The present invention also relates to a method for manufacturing a composite-material turbomachine vane comprising a blade and a fastening means to an outside element, said fastening means forming a single piece with said blade, said vane comprising long fibers positioned over at least a portion of the skin of the vane and also comprising short fibers filling in the parts of the vane that are not filled by the long fibers, said method successively comprising at least the steps of:

a) manufacturing pre-consolidated plates comprising the long fibers pre-impregnated with the first thermoplastic resin;
b) cutting the plates to the required dimensions;
c) shaping the plates;
d) injection-molding the core of the blade and the core of the fastening means with a second thermoplastic resin loaded with short fibers, said second resin being identical to the first resin or chemically compatible with the first resin, said preformed plates acting as composite inserts in the injection mold.

The present invention also relates to a rectifier stage or to a rotor stage of a turbomachine comprising composite vanes as described above.

KEY (1) Vane
(2) Blade
(3) Platform or bulb of the vane or, more generally, means for fastening the vane to an outside element
(4) Long fibers
(5) Short fibers

GENERAL DESCRIPTION THE INVENTION

The vane as in the present invention can be used in any field where vanes, whether mobile or static, are necessary. In aeronautics, it may for example be used as a compressor vane or as an outlet guide vane (OGV).

According to the present invention, the vane is made of a composite material and comprises continuous-fiber reinforcements, which will also be called long fibers, and short-fiber reinforcements. An organic matrix is associated with each reinforcement in such a way that all matrices are identical or chemically compatible in order to ensure a chemical bond between the different components. The organic matrices can be thermoplastic resins or thermosetting resins.

The continuous-fiber reinforcement is used to ensure the structural stiffness of the vanes, while the short-fiber reinforcement associated with its resin is used to fill in the volume and give the vane its final or almost final shape. The assembly of these two materials thereby allows to produce the complex shapes that the vane may assume and to directly obtain the final shape of the vane, i.e. integrating the blade and its fastening means, upon exiting the mold after manufacture.

Preferably, the continuous fibers are unidirectional or woven and the short fibers have a length of a few millimeters or less. Typically, the short fibers have a diameter comprising between 1 and 15 pm for a maximum length of 1 mm. According to the invention, the short and continuous fibers may be of the same nature or of different natures. For example, the long and short fibers may be carbon fibers or glass fibers, respectively. The fibers within the short fibers or within the long fibers may also be of different natures; for example, the long fibers can comprise glass fibers and carbon fibers.

Preferably, the short fibers are positioned at the core of the vane and the continuous fibers at the skin end, in which case the continuous fibers fit the external surface of the vane, or in an intermediate position between the skin end and the core. In the latter case, the short fibers mixed with the resin also fill in the space between the intermediate position and the skin end. The present invention also extends to embodiments where, over the length of the fibers, a same long fiber is successively positioned at the skin end of the vane and at the intermediate position.

Optionally, the surface of the composite vane as in the invention may be erosion-protected.

DETAILED DESCRIPTION OF THE INVENTION

The present invention is detailed below, as a non-limiting example, for a vane used in a turbomachine, and more specifically for a vane used in the first portion of a turbomachine, in the so-called low pressure part.

Figure 2:
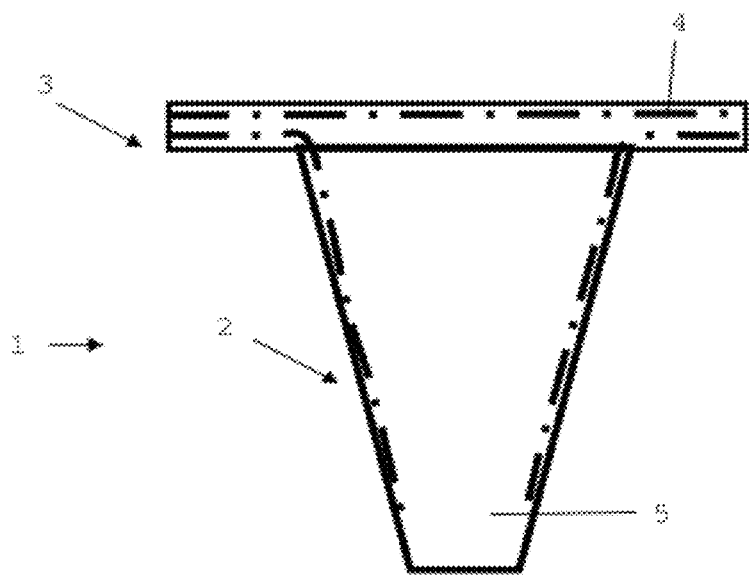
FIG. 2 shows a diagrammatic longitudinal cross-sectional view of the blade of the vane incorporating a platform as in the invention.

According to the present invention and as illustrated in FIG. 2, the vane 1 comprises a blade 2 and at the foot of the plate a platform 3 or, generally, a means for fastening the vane to an external element. In the particular case of a compressor rectifier vane, the blade comprises a foot in its first end that is intended to be fastened to an external shroud of the compressor while the other end, the head of the blade, is intended to be assembled to an internal shroud of the compressor. If the foot is of the platform type, it can form a T-shape as shown in FIG. 2, an L-shape or any other adapted shape. In the example illustrated in FIG. 3, the foot of the blade comprises, instead of a platform, a dovetail-shaped bulb 3. This bulb thus has two inclined surfaces flaring from the blade foot toward a third surface that is perpendicular to the plane of the blade. The present invention also extends to the production of a composite vane with only one blade.

Figure 1:
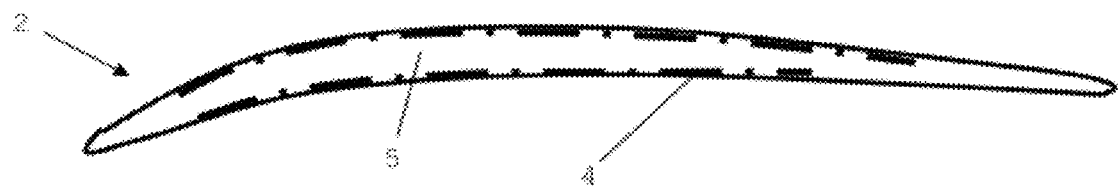
FIG. 1 shows a diagrammatic transverse cross-sectional view of the blade of a vane as in the invention.
Figure 3:
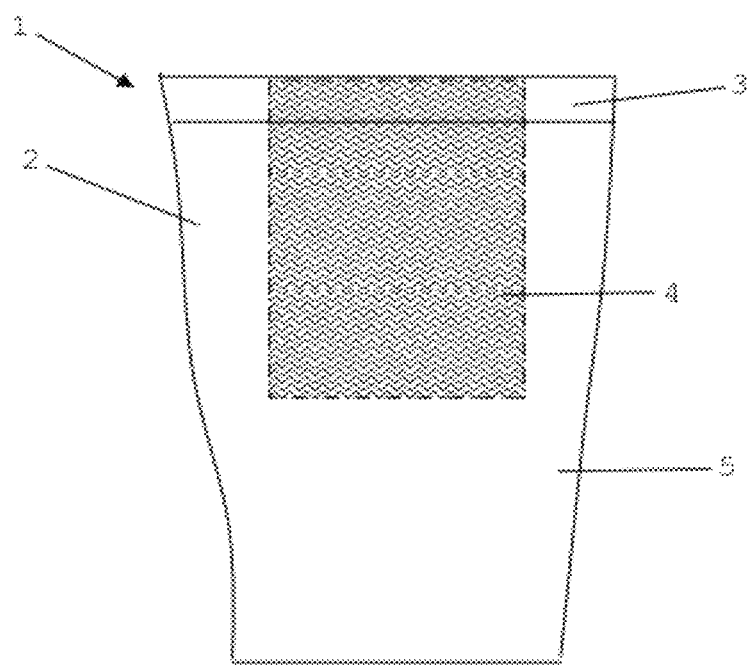
FIG. 3 shows a diagrammatic front view of a vane as in the invention.

FIGS. 1 to 3 diagrammatically illustrate the arrangement of the long fibers 4 and of the short fibers 5 within a transverse section of the blade, within a longitudinal cross-section of the foot of the blade with integrated platform, and within the vane as a whole. The long-fiber reinforcement 4 is positioned in or near the skin of the vane and the rest of the vane is filled in with short-fiber reinforcement 5. As illustrated in FIGS. 1 to 3, only a portion of the skin can be made of the long-fiber reinforcement, the skin of the vane that is not made of the long-fiber reinforcement then being filled in with short-fiber reinforcement. In this way, the skin of the blade at the level of the leading and trailing edges can be deprived of long fibers and only comprise short fibers. Likewise, the long-fiber reinforcement can extend in the skin in the longitudinal direction of the vane from the platform of the vane as far as a distance that is substantially equal to the mid-height of the blade, this distance of course being adjustable.

As illustrated in FIG. 2, the long fibers are preferably continuous between the blade and the platform or, generally, between the blade and the means for fastening the vane to an external element.

The vane as in the invention can be made using a method described below as a non-limiting example in order to manufacture a thermoplastic vane with an integrated fastening means such as, for example, a platform. The method successively comprises at least the following steps:

a) manufacturing preconsolidated plates, i.e. having undergone at least partial densification, comprising long fibers 4 and a first thermoplastic resin;
b) cutting the plates to the required dimensions;
c) shaping the plates;
d) injection-molding the core of the blade 2 and the core of the fastening means 3 with a second thermoplastic resin loaded with short fibers, the second resin being identical to the first resin or chemically compatible with the first resin, said preformed plates acting as composite inserts in the injection mold.

According to the invention, the final shape of the vane can be directly obtained upon exiting the mold. After step d) for injection molding, the part may also undergo other operations such as machining operations or any operation required to implement protection against erosion. Protection against erosion can also be directly integrated into the part by adding filler into the first and/or second resin during manufacture.

As already mentioned, through the use of a same resin or of chemically compatible resins in step a) and d), the different component parts of the vane are bound by a chemical bond.

The method extends to the production of thermoplastic or thermosetting vanes with a skin at least partially made of long fibers and the core at least partially made of short fibers, the steps of the method being possibly adapted accordingly.

It will also be specified that, preferably, the continuous-fiber reinforcement is preimpregnated if a composite vane with thermoplastic matrix is being produced, or it involves dry reinforcement or pre-impregnated reinforcement if a composite vane with a thermosetting matrix, for example of the epoxy type, is being produced.

ADVANTAGES OF THE INVENTION

The vanes thus produced will benefit from savings in terms of mass relative to the existing vanes owing to the use of composite materials.

They will also benefit from a limited manufacturing cost owing to the reduced number of steps in the manufacturing method, the final shape being possibly directly obtained upon leaving the mold.

Using a same resin or compatible resins for the continuous fibers and the short fibers allows to obtain a chemical bond between the different components (within the blade and between the blade and the fastening means) and to ultimately obtain a composite vane with a continuous matrix.

The vane as in the invention thus allows to manufacture fixed vanes or mobile vanes with low mass and at low cost.

The method as in the invention allows to produce complex shapes within a wide range of thicknesses.

What is claimed is:

1. A composite-material turbomachine vane comprising a blade, wherein said vane comprises:
   a core;
   a skin surrounding the core;
   a first end;
   a second end;
   a first resin reinforced with long fiber;
   a second resin reinforced with short fibers, said first and second resins being chemically compatible, said long fibers serving to stiffen the vane and said short fibers dispersed in the second resin serving to fill in the parts of the vane that are not reinforced by the long fibers and giving the vane its substantially final shape;
   at the first end, a means for fastening said vane to an external element and wherein said means for fastening is integrated into the blade of the vane;
   wherein the long fibers are continuous between the blade and the means for fastening; the continuous fibers positioned in an intermediate position between the skin end and the core of the vane;
   the short fibers positioned at the core of the vane and between the intermediate position and the skin end; and
   wherein the long fibers are unidirectional or woven and wherein the short fibers have a length that is shorter than a few millimeters.

2. The turbomachine vane as in claim 1, wherein the long fibers are positioned at the skin end of the vane.

3. The turbomachine vane as in claim 1, wherein a same long fiber is positioned over its length at the skin end of the vane and in the intermediate position between the skin end and the core of the vane.

4. The turbomachine vane as in claim 1, wherein the means for fastening is a platform.

5. The turbomachine vane as in claim 4, wherein the blade and the platform form a shape selected from the group consisting of an L-shape and a T-shape.

6. The turbomachine vane as in claim 1, wherein the short fibers and the long fibers are selected from the group consisting of glass fibers and carbon fibers.

7. The turbomachine vane as in claim 1, wherein the first and second resins are thermoplastic resins.

8. The turbomachine vane as in claim 1, wherein the first and second resins are thermosetting resins.

9. The turbomachine vane as in claim 1, wherein the skin of the vane is also protected against erosion.

10. The turbomachine vane as in claim 1, wherein at least the first resin comprises fillers ensuring protection of the vane against erosion.

11. The turbomachine vane as in claim 1, wherein the first and second resins are identical.

12. The turbomachine vane as in claim 1, wherein the means for fastening is a dovetail-shaped bulb.

13. The turbomachine vane as in claim 1, wherein at least the second resin comprises fillers ensuring protection of the vane against erosion.

14. A method for manufacturing a composite material turbomachine vane of claim 1 wherein the second resin is identical to the first resin.

15. A rectifier stage or rotor stage of a turbomachine comprising composite vanes as in claim 1.

* * * * *